US011733383B2

(12) United States Patent
Chiang et al.

(10) Patent No.: US 11,733,383 B2
(45) Date of Patent: Aug. 22, 2023

(54) FRONT OBSTACLE ALERTING SYSTEM

(71) Applicants: Min-Yueh Chiang, New Taipei (TW); Jonathan-Paul Hsu, New Taipei (TW); Frances-Adrienne Hsu, New Taipei (TW); Isis Megan Hsu, New Taipei (TW); David Myles Hsu, New Taipei (TW)

(72) Inventors: Min-Yueh Chiang, New Taipei (TW); Jonathan-Paul Hsu, New Taipei (TW); Frances-Adrienne Hsu, New Taipei (TW); Isis Megan Hsu, New Taipei (TW); David Myles Hsu, New Taipei (TW)

( * ) Notice: Subject to any disclaimer, the term of this patent is extended or adjusted under 35 U.S.C. 154(b) by 166 days.

(21) Appl. No.: 17/510,206

(22) Filed: Oct. 25, 2021

(65) Prior Publication Data
US 2022/0381908 A1    Dec. 1, 2022

(30) Foreign Application Priority Data
Jun. 1, 2021   (TW) .................................. 110206350

(51) Int. Cl.
*G01S 15/931*   (2020.01)
*B60Q 5/00*     (2006.01)

(52) U.S. Cl.
CPC .............. *G01S 15/931* (2013.01); *B60Q 5/00* (2013.01); *G01S 2015/937* (2013.01)

(58) Field of Classification Search
None
See application file for complete search history.

(56) References Cited

U.S. PATENT DOCUMENTS

| | | | | |
|---|---|---|---|---|
| 5,202,661 A | * | 4/1993 | Everett, Jr. | G08B 29/188 340/565 |
| 11,208,116 B2 | * | 12/2021 | Emura | B60R 21/00 |
| 11,500,378 B2 | * | 11/2022 | Kentley-Klay | B60Q 1/26 |
| 2004/0178892 A1 | * | 9/2004 | Anderson | B60Q 1/2665 340/435 |
| 2005/0190047 A1 | * | 9/2005 | Lemke | G01S 15/86 340/691.2 |
| 2006/0208169 A1 | * | 9/2006 | Breed | G01S 17/88 250/221 |
| 2011/0202305 A1 | * | 8/2011 | Willis | G01C 21/188 702/141 |
| 2012/0025964 A1 | * | 2/2012 | Beggs | B66F 17/003 340/435 |
| 2019/0385385 A1 | * | 12/2019 | Davidson | G07C 5/0808 |
| 2022/0381908 A1 | * | 12/2022 | Chiang | B60Q 5/00 |

* cited by examiner

*Primary Examiner* — Fekadeselassie Girma
(74) *Attorney, Agent, or Firm* — Maschoff Brennan (57) ABSTRACT

Disclosed is a front obstacle alerting system comprising an obstacle-side signal emitting device and a vehicle-side alerting device, wherein the obstacle-side signal emitting device is a signal emitting element of a front obstacle and emits a directional ultrasonic wave toward a rear side of the front obstacle, and the vehicle-side alerting device is disposed in or on a vehicle and correspondingly outputs an alerting signal according to the directional ultrasonic wave received from a front side of the vehicle.

7 Claims, 6 Drawing Sheets

FRONT OBSTACLE ALERTING SYSTEM

FIELD OF THE INVENTION

The present invention relates to a vehicle safety alerting system, and more particularly relates to a front obstacle alerting system.

BACKGROUND OF THE INVENTION

With the development of technology, there are more and more vehicle safety systems in the market. A vehicle safety alerting system is one of technology that attracts attention.

A conventional vehicle safety alerting system mainly relies on a camera installed in a vehicle to capture images of a front road to determine whether there is a front vehicle existing in front of the vehicle, and to determine a relative distance or speed between the front vehicle and the vehicle so as to maintain a safe distance from the front vehicle. However, in environments with poor visibility such as dense fog or heavy rain, the camera is difficult to capture clear images, resulting in a dilemma that a driver should slow down the vehicle to prevent crashing into the front vehicle or maintain the current speed to prevent a rear vehicle from crashing.

SUMMARY OF THE INVENTION

Therefore, an objective of the present invention is to provide a front obstacle alerting system, which can play a warning role under poor vision conditions such as dense fog or heavy rain to maintain driving safety.

In order to overcome the technical problems in prior art, the present invention provides a front obstacle alerting system which alerts for a front obstacle existing in front of a vehicle, comprising: an obstacle-side signal emitting device, which is a signal emitting element of the front obstacle, the obstacle-side signal emitting device including a signal generator and a directional speaker, the signal generator being connected to the directional speaker, wherein the signal generator is configured to enable the directional speaker to actively emit, in a directional propagating manner, a directional ultrasonic wave containing an obstacle presence signal toward rear side of the front obstacle; and a vehicle-side alerting device, which is disposed in or on the vehicle, the vehicle-side alerting device including an ultrasonic receiver, a signal analyzer and a front obstacle alarm, wherein the ultrasonic receiver is arranged facing front side of the vehicle to receive the directional ultrasonic wave transmitting from the front side of the vehicle, the signal analyzer is connected to the ultrasonic receiver and is configured to analyze and determine whether the directional ultrasonic wave received by the ultrasonic receiver contains the obstacle presence signal or not, the front obstacle alarm is connected to the signal analyzer and is configured to output an alerting signal when the directional ultrasonic wave received by the ultrasonic receiver contains the obstacle presence signal.

In one embodiment of the present invention, the front obstacle alerting system is provided, wherein the front obstacle is a front vehicle, the obstacle-side signal emitting device is disposed in or on the front vehicle to emit the directional ultrasonic wave toward rear side of the front vehicle.

In one embodiment of the present invention, the front obstacle alerting system is provided, wherein the front obstacle is a warning triangle.

In one embodiment of the present invention, the front obstacle alerting system is provided, wherein the directional speaker is an ultrasonic directional speaker array which produces the directional ultrasonic wave by combining a non-directional modulating wave with a directional carrier wave.

In one embodiment of the present invention, the front obstacle alerting system is provided, wherein the obstacle-side signal emitting device further includes a trigger connected to the directional speaker, wherein the trigger is configured to, when the front vehicle turns on its rear fog light, be triggered to correspondingly activate the directional speaker such that the directional ultrasonic wave is emitted while the rear fog light of the front vehicle is turned on.

In one embodiment of the present invention, the front obstacle alerting system is provided, wherein the vehicle is equipped with a front ultrasonic distance measuring device, the front ultrasonic distance measuring device includes an ultrasonic sensor and a distance warning unit connected to the ultrasonic sensor, the ultrasonic sensor of the front ultrasonic distance measuring device is used as the ultrasonic receiver of the vehicle-side alerting device, and the signal analyzer is externally connected to the ultrasonic sensor via an external signal connector.

In one embodiment of the present invention, the front obstacle alerting system is provided further comprising a vehicle-side signal emitting device, which is disposed in or on the vehicle, the vehicle-side signal emitting device including a vehicle-side signal generator and a vehicle-side directional speaker, the vehicle-side signal generator being connected to the vehicle-side directional speaker, wherein the vehicle-side signal generator is configured to enable the vehicle-side directional speaker to actively emit, in a directional propagating manner, another directional ultrasonic wave containing another obstacle presence signal toward rear side of the vehicle so as to alert a rear vehicle.

With the technical means adopted by the present invention, the front obstacle alerting system of the present invention can still determine whether there is a front obstacle such as a front vehicle or a warning tripod in front of the vehicle by emitting and receiving the directional ultrasonic wave even under poor vision conditions such as dense fog or heavy rain. It enables drivers to understand the road conditions in front of the vehicle, so that they can easily make correct responses to effectively maintain driving safety.

DETAILED DESCRIPTION OF THE PREFERRED EMBODIMENTS

The preferred embodiments of the present invention are described in detail below with reference to FIG. 1 to FIG. 6. The description is used for explaining the embodiments of the present invention only, but not for limiting the scope of the claims.

Figure 1:
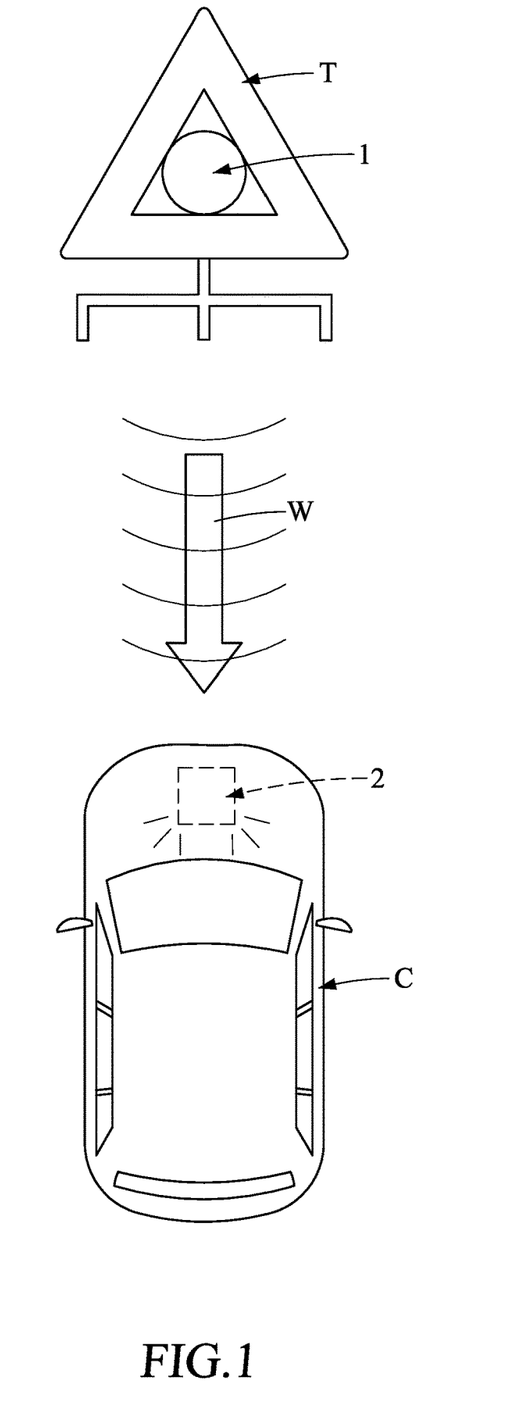
FIG. 1 is a schematic drawing illustrating a front obstacle alerting system according to an embodiment of the present invention.

As shown in FIG. 1, a front obstacle alerting system according to an embodiment of the present invention which alerts for a front obstacle existing in front of a vehicle C comprises an obstacle-side signal emitting device 1 and a vehicle-side alerting device 2.

Figure 2:
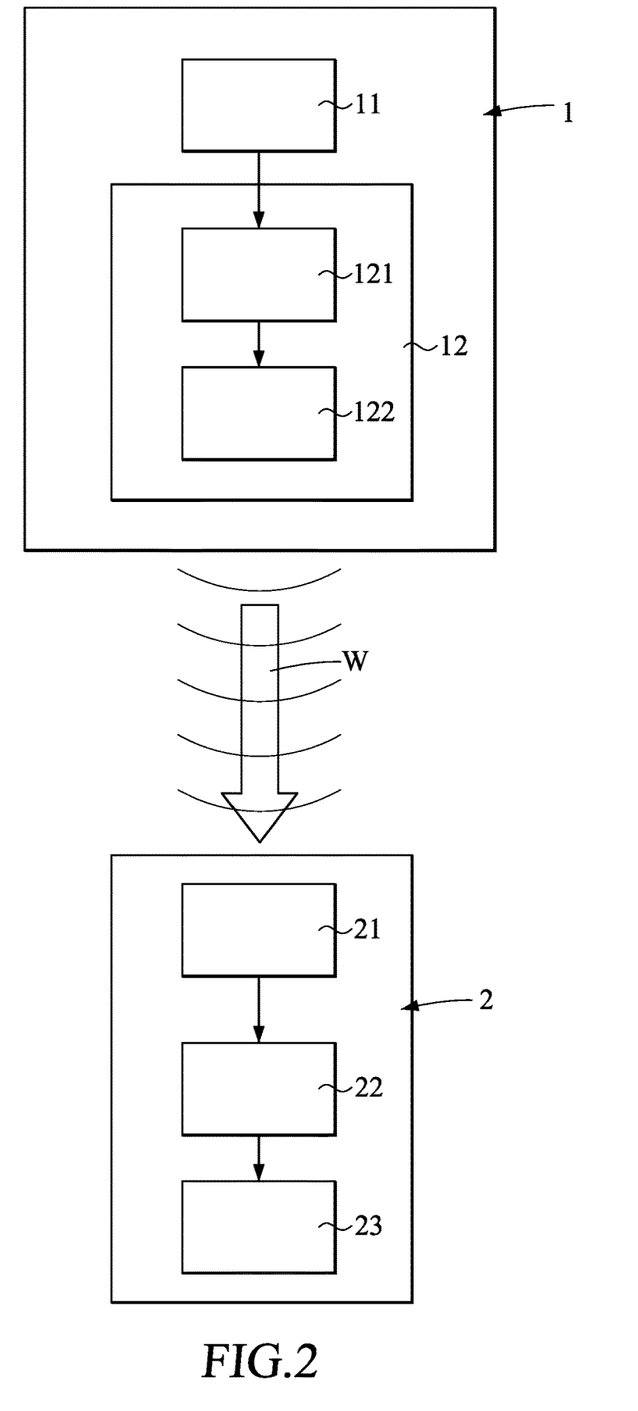
FIG. 2 is a schematic block diagram of the front obstacle alerting system according to the embodiment of the present invention.

As shown in FIG. 1 and FIG. 2, the obstacle-side signal emitting device 1 is a signal emitting element of the front obstacle, the obstacle-side signal emitting device 1 includes a signal generator 11 and a directional speaker 12, the signal generator 11 is connected to the directional speaker 12, wherein the signal generator 11 is configured to enable the directional speaker 12 to actively emit, in a directional propagating manner, a directional ultrasonic wave W containing an obstacle presence signal toward rear side of the front obstacle.

Specifically, in the present embodiment, the front obstacle is a warning triangle T, the obstacle-side signal emitting device 1 is disposed in the warning triangle T. It is noted that, in the context of the present invention, the terms "front side/front" and "rear side/rear" are defined according to the driving direction of the vehicle driving on the road. In other words, although the warning tripod T is generally placed on the road with its front facing rear side of the road, the obstacle-side signal emitting device 1 is arranged to the warning tripod T with the directional ultrasonic wave W being emitted toward the rear of the road.

In the present embodiment, the directional speaker 12 is an ultrasonic directional speaker array. The ultrasonic directional speaker array mainly includes an ultrasonic array driver 121 and an ultrasonic emission array 122. The ultrasonic directional speaker array produces the directional ultrasonic wave W by combining a non-directional modulating wave with a directional carrier wave. Specifically, the ultrasonic directional speaker produces a sound wave by combining the non-directional modulating wave with the directional carrier wave such that the sound wave becomes a narrow and focused sound beam which can propagate to a specific target in a specific direction instead of spreading over a fairly wide area. In this way, the directional ultrasonic wave W can be emitted toward the rear side of the front obstacle by the obstacle-side signal emitting device 1 without being received in other directions. Preferably, the directional speaker 12 is a 40 KHz ultrasonic directional speaker array of having the effective range up to 100 meters (when a large array and high power is provided).

As shown in FIG. 1 and FIG. 2, the vehicle-side alerting device 2 is disposed in or on the vehicle C, the vehicle-side alerting device 2 includes an ultrasonic receiver 21, a signal analyzer 22 and a front obstacle alarm 23, wherein the ultrasonic receiver 21 is arranged facing front side of the vehicle C to receive the directional ultrasonic wave W transmitting from the front side of the vehicle C, the signal analyzer 22 is connected to the ultrasonic receiver 21 and is configured to analyze and determine whether the directional ultrasonic wave W received by the ultrasonic receiver 21 contains the obstacle presence signal or not, the front obstacle alarm 23 is connected to the signal analyzer 22 and is configured to output an alerting signal when the directional ultrasonic wave W received by the ultrasonic receiver 21 contains the obstacle presence signal.

Specifically, the ultrasonic receiver 21 is a receiver arranged (e.g., at a front end of the vehicle C) to receive ultrasonic waves including the directional ultrasonic wave W transmitting from the front side of the vehicle C and correspondingly output a sensing signal. The signal analyzer 22 is connected to the ultrasonic receiver 21, and analyzes the sensing signal output from the ultrasonic receiver 21 to determine whether the ultrasonic wave received by the ultrasonic receiver 21 contains the obstacle presence signal or not. When the received ultrasonic wave is the directional ultrasonic wave W, it means that the obstacle-side signal emitting device 1 is currently in front of the vehicle-side alerting device 2, that is, the front obstacle exists in front of the vehicle C. At this time, the front obstacle alarm 23 outputs an alerting signal according to such result of analysis and determination of the signal analyzer 22. The alerting signal may be a voice warning, a warning sound, or any other type of alerting signal which can promote the driver of the vehicle C to pay attention to the front obstacle existing in front of the vehicle C.

Figure 3:
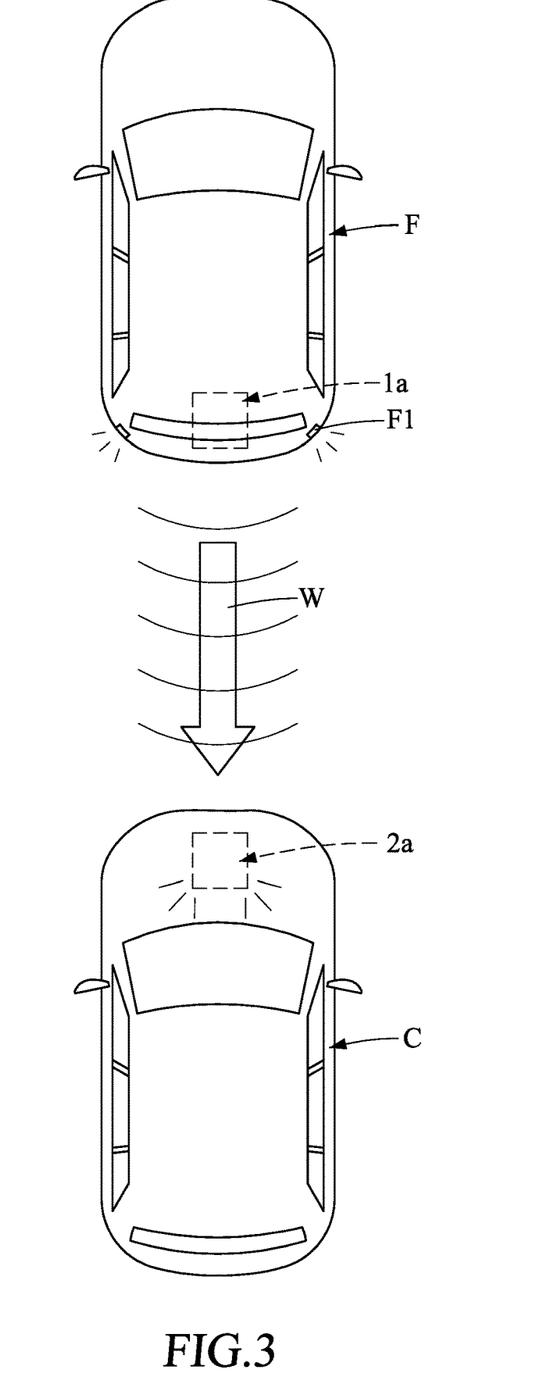
FIG. 3 is a schematic drawing illustrating a front obstacle alerting system according to another embodiment of the present invention.
Figure 4:
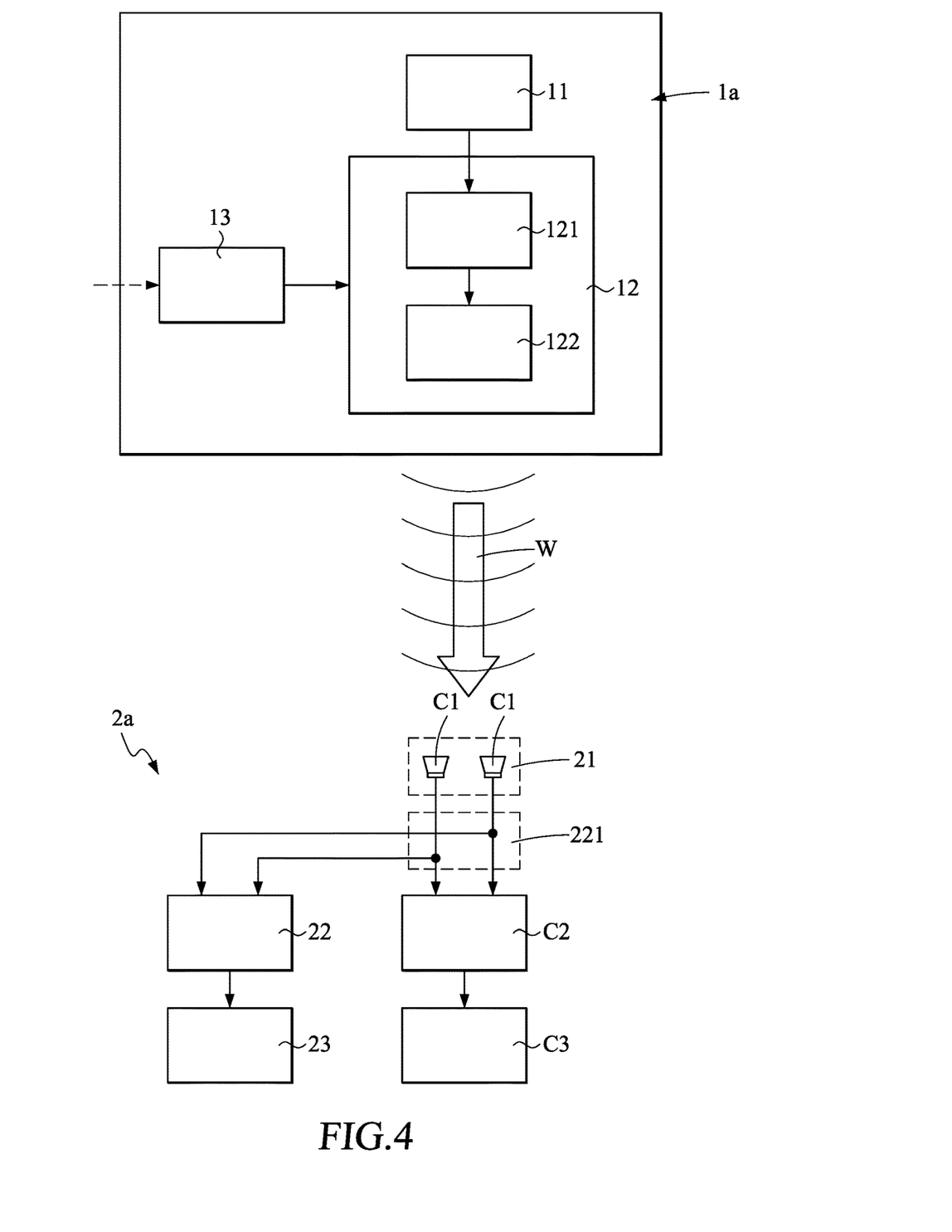
FIG. 4 is a schematic block diagram of the front obstacle alerting system according to another embodiment of the present invention.

Please refer to FIG. 3 and FIG. 4, a front obstacle alerting system according to another embodiment of the present invention is shown. The structure of the front obstacle alerting system in the present embodiment is similar to that of the front obstacle alerting system in the previous embodiment, identical elements are designated with the same reference numerals and the detailed description of such elements will be omitted as appropriate.

In this embodiment, the front obstacle is a front vehicle F, the obstacle-side signal emitting device 1a is disposed in or on the front vehicle F (e.g., at a rear end of the front vehicle F) to emit the directional ultrasonic wave W toward rear side of the front vehicle F.

Furthermore, in this embodiment, the obstacle-side signal emitting device 1a further includes a trigger 13 connected to the directional speaker 12, wherein the trigger 13 is configured to, when the front vehicle F turns on its rear fog light F1, be triggered to correspondingly activate the directional speaker 12 such that the directional ultrasonic wave W is emitted while the rear fog light of the front vehicle F is turned on. Specifically, the trigger 13 is connected to a controller of the rear fog light F1 of the front vehicle F, and thereby the trigger 13 can detect a warning operation performed by the front vehicle F using the rear fog light F1 and simultaneously activate the directional speaker 12, so that the directional speaker 12 starts to emit the directional ultrasonic wave W. In this way, the obstacle-side signal emitting device 1a can emit the directional ultrasonic wave W to the rear while the front vehicle F turns on the rear fog light F1 due to the bad environmental conditions of dense fog or heavy rain, so as to achieve a further warning effect.

Moreover, in this embodiment, the vehicle C is equipped with a front ultrasonic distance measuring device, the front ultrasonic distance measuring device includes an ultrasonic sensor C1 and a distance warning unit C2 connected to the ultrasonic sensor C1, the ultrasonic sensor C1 of the front ultrasonic distance measuring device is used as the ultrasonic receiver 21 of the vehicle-side alerting device 2a, and the signal analyzer 22 is externally connected to the ultrasonic sensor 21 via an external signal connector 221. Specifically, the vehicle-side alerting device 2a is refitted from the front ultrasonic distance measuring device with which the vehicle C is originally equipped, the front ultrasonic distance measuring device with which the vehicle C is originally equipped utilizes the ultrasonic sensor C1 to transmit and receive ultrasonic wave, and utilizes the distance warning unit C2 to perform distance measurement based on a time difference between the transmission and reception of ultrasonic wave of the ultrasonic sensor C1 and output an alerting signal by an alarm such as a buzzer C3 according to the distance measurement result. The signal analyzer 22 of the vehicle-side alerting device 2a is connected to the ultrasonic sensor C1 via the external signal connector 221, that is, the ultrasonic sensor C1 is used as the ultrasonic receiver 21, to acquire the ultrasonic wave received by the ultrasonic sensor C1 and to analyze and determine whether the ultrasonic wave is the directional ultrasonic wave W containing the obstacle presence signal and emitted by the obstacle-side signal emitting device 1a. With such structure, the installation space and installation cost of the vehicle-side alerting device 2a can be effectively reduced.

Figure 5:
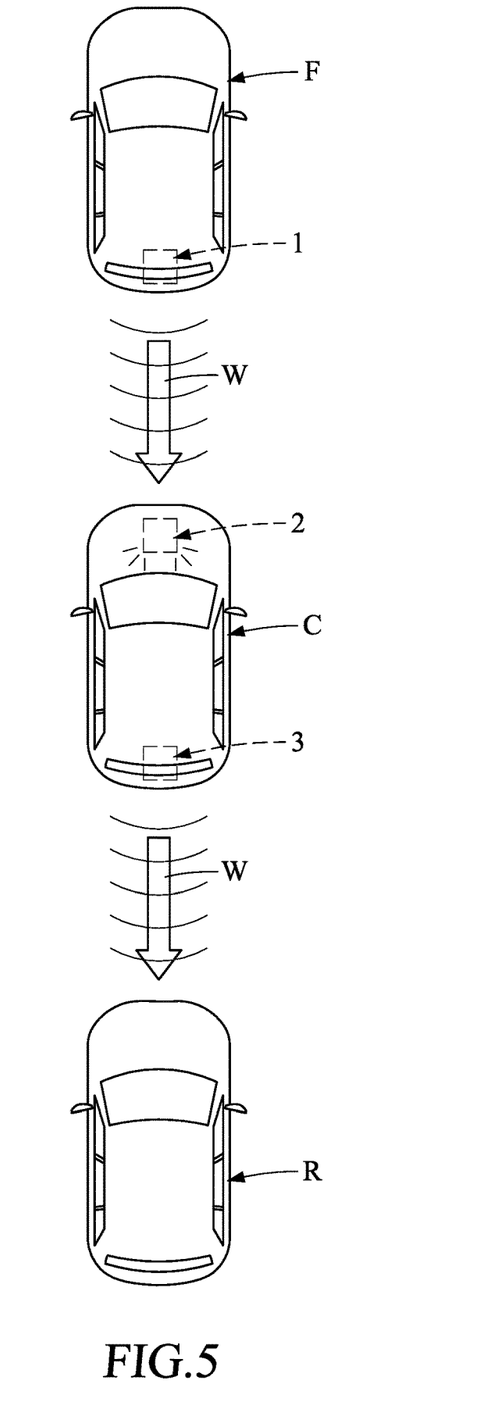
FIG. 5 is a schematic drawing illustrating a front obstacle alerting system according to another embodiment of the present invention.
Figure 6:
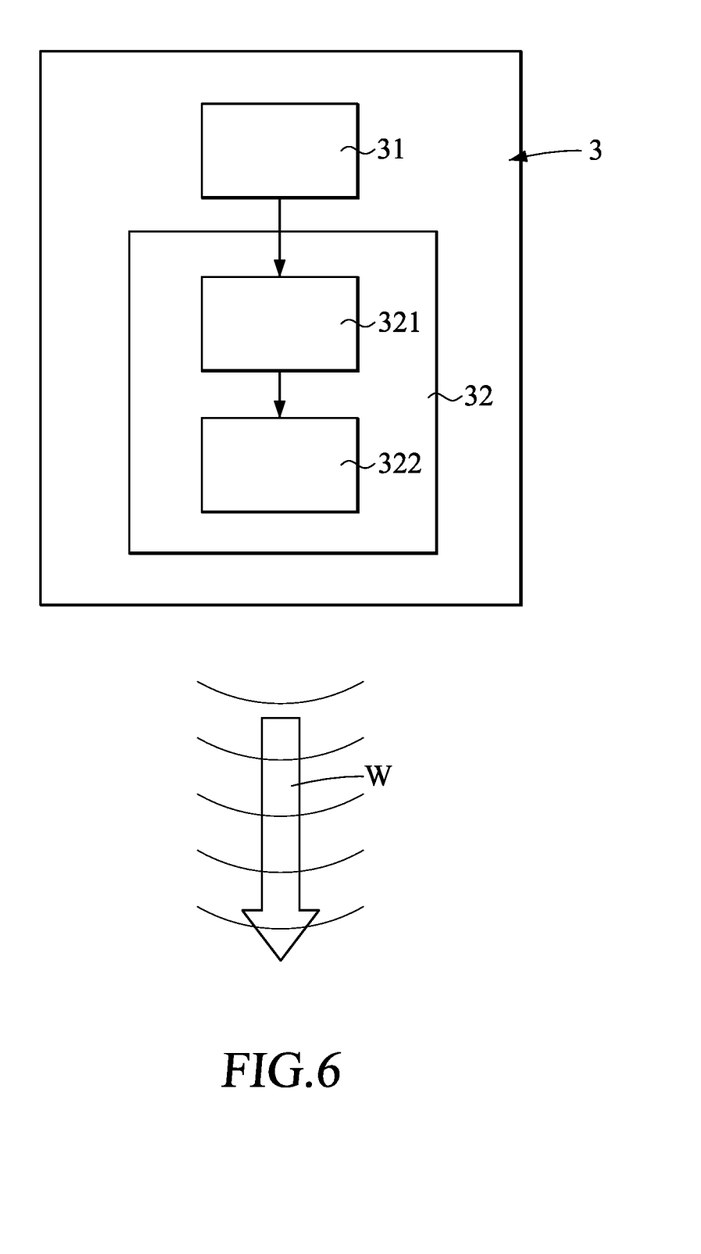
FIG. 6 is a schematic block diagram of a vehicle-side signal emitting device of the front obstacle alerting system according to another embodiment of the present invention.

Please refer to FIG. 5 and FIG. 6, a front obstacle alerting system according to another embodiment of the present invention is shown. The structure of the front obstacle alerting system in the present embodiment is similar to that of the front obstacle alerting systems in the previous embodiments, identical elements are designated with the same reference numerals and the detailed description of such elements will be omitted as appropriate.

The main difference between the front obstacle alerting system in the present embodiment and the front obstacle alerting systems in the previous embodiments is that the front obstacle alerting system in the present embodiment further comprises a vehicle-side signal emitting device 3, which is disposed in or on the vehicle C, the vehicle-side signal emitting device 3 includes a vehicle-side signal generator 31 and a vehicle-side directional speaker 32, the vehicle-side signal generator 31 is connected to the vehicle-side directional speaker 32, wherein the vehicle-side signal generator 31 is configured to enable the vehicle-side directional speaker 32 to actively emit, in a directional propagating manner, another directional ultrasonic wave W containing another obstacle presence signal toward rear side of the vehicle C so as to alert a rear vehicle R. Specifically, in the present embodiment, the vehicle-side signal emitting device 3 has substantially the same structure as the obstacle-side signal emitting device 1, wherein the vehicle-side signal emitting device 3 is an ultrasonic directional speaker array and mainly includes an ultrasonic array driver 321 and an ultrasonic emission array 322. With the provision of the vehicle-side signal emitting device 3, the rear vehicle R equipped with the front obstacle alerting system can be alerted for a front obstacle (i.e., the vehicle C) existing in front of the rear vehicle R to maintain driving safety.

With the structure described above, the front obstacle alerting system of the present invention can still determine whether there is a front obstacle such as a front vehicle F or a warning tripod T in front of the vehicle C by emitting and receiving the directional ultrasonic wave W even under poor vision conditions such as dense fog or heavy rain. It enables drivers to understand the road conditions in front of the vehicle C, so that they can easily make correct responses to effectively maintain driving safety.

The above description is only an explanation of the preferred embodiments of the present invention. One having ordinary skill in the art can make various modifications according to the above description and the claims defined below. However, those modifications shall still fall within the scope of the present invention.

What is claimed is:

1. A front obstacle alerting system which alerts for a front obstacle existing in front of a vehicle, comprising:
    an obstacle-side signal emitting device, which is a signal emitting element of the front obstacle, the obstacle-side signal emitting device including a signal generator and a directional speaker, the signal generator being connected to the directional speaker, wherein the signal generator is configured to enable the directional speaker to actively emit, in a directional propagating manner, a directional ultrasonic wave containing an obstacle presence signal toward rear side of the front obstacle; and
    a vehicle-side alerting device, which is disposed in or on the vehicle, the vehicle-side alerting device including an ultrasonic receiver, a signal analyzer and a front obstacle alarm, wherein the ultrasonic receiver is arranged facing front side of the vehicle to receive the directional ultrasonic wave transmitting from the front side of the vehicle, the signal analyzer is connected to the ultrasonic receiver and is configured to analyze and determine whether the directional ultrasonic wave received by the ultrasonic receiver contains the obstacle presence signal or not, the front obstacle alarm is connected to the signal analyzer and is configured to output an alerting signal when the directional ultrasonic wave received by the ultrasonic receiver contains the obstacle presence signal.

2. The front obstacle alerting system as claimed in claim 1, wherein the front obstacle is a front vehicle, the obstacle-side signal emitting device is disposed in or on the front vehicle to emit the directional ultrasonic wave toward rear side of the front vehicle.

3. The front obstacle alerting system as claimed in claim 1, wherein the front obstacle is a warning triangle.

4. The front obstacle alerting system as claimed in claim 1, wherein the directional speaker is an ultrasonic directional speaker array which produces the directional ultrasonic wave by combining a non-directional modulating wave with a directional carrier wave.

5. The front obstacle alerting system as claimed in claim 2, wherein the obstacle-side signal emitting device further includes a trigger connected to the directional speaker, wherein the trigger is configured to, when the front vehicle turns on its rear fog light, be triggered to correspondingly activate the directional speaker such that the directional ultrasonic wave is emitted while the rear fog light of the front vehicle is turned on.

6. The front obstacle alerting system as claimed in claim 1, wherein the vehicle is equipped with a front ultrasonic distance measuring device, the front ultrasonic distance measuring device includes an ultrasonic sensor and a distance warning unit connected to the ultrasonic sensor, the ultrasonic sensor of the front ultrasonic distance measuring device is used as the ultrasonic receiver of the vehicle-side alerting device, and the signal analyzer is externally connected to the ultrasonic sensor via an external signal connector.

7. The front obstacle alerting system as claimed in claim 1, further comprising a vehicle-side signal emitting device, which is disposed in or on the vehicle, the vehicle-side signal emitting device including a vehicle-side signal generator and a vehicle-side directional speaker, the vehicle-side signal generator being connected to the vehicle-side directional speaker, wherein the vehicle-side signal generator is configured to enable the vehicle-side directional speaker to actively emit, in a directional propagating manner, another directional ultrasonic wave containing another obstacle presence signal toward rear side of the vehicle so as to alert a rear vehicle.

\* \* \* \* \*